United States Patent [19]

Marra

[11] Patent Number: 4,509,242
[45] Date of Patent: Apr. 9, 1985

[54] TOOL FOR QUICK REMOVAL OF KNOCK-OUT PLUGS

[76] Inventor: Gerardo J. Marra, 175 Cherry La., River Edge, N.J. 07661

[21] Appl. No.: 503,242

[22] Filed: Jun. 10, 1983

[51] Int. Cl.³ .............................................. B23P 19/04
[52] U.S. Cl. ........................................ 29/267; 29/270; 30/359
[58] Field of Search ................. 30/429, 443, 446, 359, 30/287, 299; 81/3.46; 29/267, 270

[56] References Cited

U.S. PATENT DOCUMENTS

| 171,463 | 12/1875 | Witsil | 30/429 |
|---|---|---|---|
| 417,010 | 12/1889 | Ekman | 30/429 |
| 684,825 | 10/1901 | Johnson | 30/429 |
| 1,656,515 | 1/1928 | Garrison | 30/429 |
| 2,018,083 | 10/1935 | Murdock | 81/3.46 |
| 2,106,639 | 1/1938 | Jenkinson | 81/3.46 |
| 2,535,717 | 12/1950 | Bennett | 30/299 |
| 3,300,074 | 1/1967 | Heubl | 81/3.46 |
| 3,713,200 | 1/1973 | Burns | 29/267 |
| 3,736,643 | 6/1973 | Pepe | 29/267 |
| 4,167,056 | 9/1979 | Nattel | 29/267 |

Primary Examiner—Robert C. Watson
Attorney, Agent, or Firm—Richard L. Miller

[57] ABSTRACT

A tool for quick removal of knock-out plugs in an electrical box within a wall and consists of an insulated handle and a triangular shaped prying blade hook to knock-out the plugs from the electrical box.

5 Claims, 3 Drawing Figures

TOOL FOR QUICK REMOVAL OF KNOCK-OUT PLUGS

BACKGROUND OF THE INVENTION

The instant invention relates generally to tools. More specifically, it relates to a tool for quick removal of knock-out plugs in an electrical box within a wall.

The old way of removing the knock-out plugs in an electrical box is by using two tools, such as, a screw driver and a hammer. This requires using both hands to hold the tools. If the screw driver is at a wrong angle within the electrical box damage to the screw driver, the electrical box or the wall can occur.

Numerous tools have been provided in prior art that are adapted to perform various tasks. For example, U.S. Pat. Nos. 3,713,200; 3,736,643; and 4,167,056 all are illustrative of such prior art. While these units may be suitable for the particular purpose to which they address, they would not be as suitable for the purpose of the present invention as heretofore described.

SUMMARY OF THE INVENTION

A principal object of the present invention is to provide a tool for quick removal of knock-out plugs that can be used with one hand.

Another object is to provide a tool for quick removal of knock-out plugs that will not damage the electrical box and the wall.

An additional object is to provide a tool for quick removal of knock-out plugs that is safe and will not cause injury to the user.

A further object is to provide a tool for quick removal of knock-out plugs that is simple and easy to use.

A still further object is to provide a tool for quick removal of knock-out plugs that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DESCRIPTION OF THE PREFERRED EMBODIMENT

Figure 1:
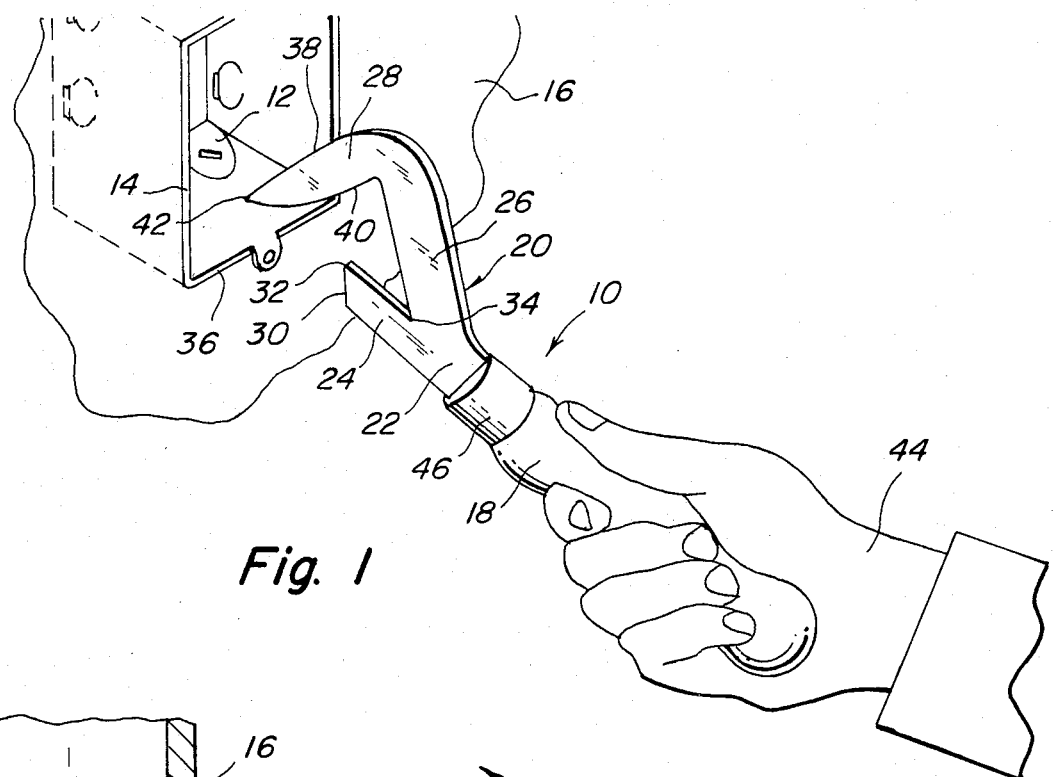
FIG. 1 is a perspective view of the invention being placed into an electrical box in order that a plug be removed.

Turning now descriptively to the drawings in which similar reference characters denote similar elements throughout the several views, FIGS. 1 though 3 illustrates a tool 10 for quick removal of knock-out plugs 12 in an electrical box 14 within a wall 16. The tool 10 consists of an insulated handle 18 and a triangular shaped prying blade hook 20 to knock out the plugs from the electrical box 14.

The hook 20 consists of a flat shank portion 22, a piercing blade portion 24, an arm blade portion 26 and an engaging blade portion 28.

The flat shank portion 22 is secured within the handle 18. The piercing blade portion 24 has a beveled end 30 forming a top point 32. The piercing blade portion 24 extends outwardly from the flat shank portion 22 to pierce the wall 16 adjacent the electrical box 14.

The arm blade portion 26 extends outwardly at an angle from top of the piercing blade portion 24 forming a pivot point 34 therebetween to engage front edge 36 of the electrical box 14.

The engaging blade portion 28 has curved outer and inner edges 38 and 40 thus forming a tip end 42. The engaging blade portion 28 extends outwardly and downwardly at an angle from end of the arm blade portion 26 forming a triangular configuration. The tip end 42 of the engaging blade portion 28 will knock out the plug 12 in the electrical box 14 when the handle 18 is pivoted by hand 44.

The tool 10 can also have a ferrule 46 attached around end of the handle 18 where the flat shank portion 22 engages the handle 18 to give added strength to the handle 18 of the tool 10.

The triangular shaped prying blade hook 20 may be made out of a single piece of one eighth of an inch thick steel. The handle 18 may be fabricated out of wood or plastic so that the hand 44 will be insulated from any electricity within the electrical box 14.

Figure 3:
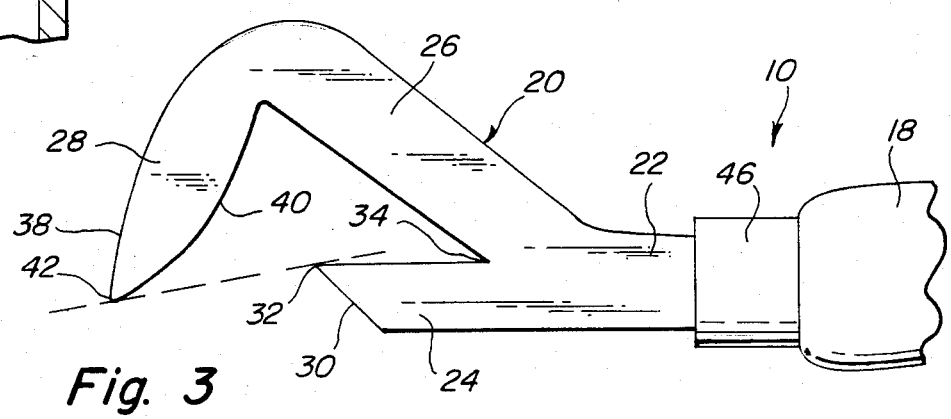
FIG. 3 is an enlarged side elevational view with handle broken away showing detail of the prying portion of the tool.

The tool 10 is designed to be used in an electrical box 14 that is two and one half inches deep. If the tool 10 is used in a small electrical box, such as two, or one and one half, inches deep, the curved outer edge 38 of the engaging blade portion 28 will slide against back wall of the electrical box until it engages the plug to be knockout. The top point 32 of the piercing blade portion 24 will now act as the initial pivot point and this pivot point will switch to a secondary location along blade portion 24 as the tool is cause to knock out a plug. The dotted line in FIG. 3 illustrates the point of first contact between the tool and an electrical box.

The tool 10 can knock-out plugs in the bottom, sides and top of the electrical box. It will not damage the wall 16 or the electrical box 14 and can fit into a pocket when not being used.

Figure 2:
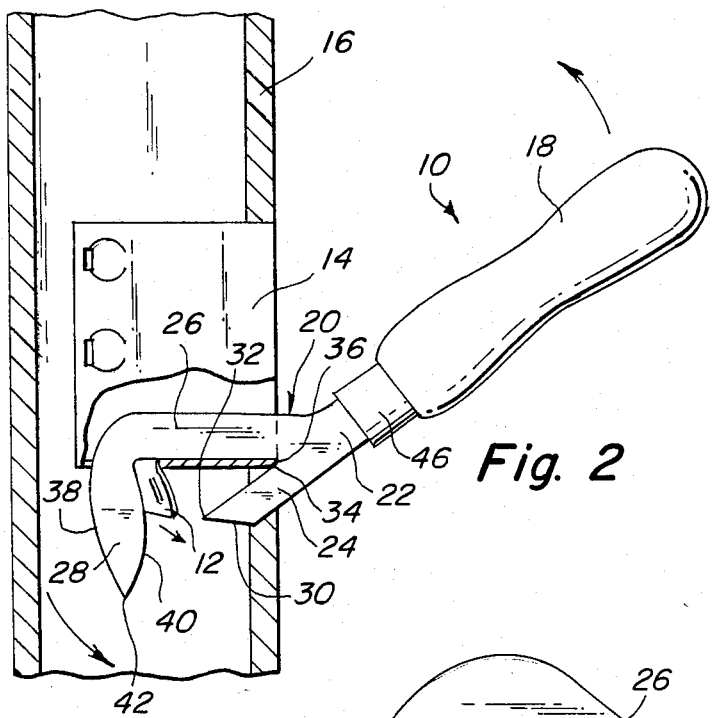
FIG. 2 is a side elevational view partly in section showing quick removal of a knock out plug by the tool.

An additional design feature of this tool 10 is such that when the tool is sized too a an electrical box 14 whereby the distanced from the front edge 36 of the box to the knock out plug 12 is approximately the same as the inside dimension of arm 26, then the tool will prevent the user from accidently slipping and hitting the wall 16 with the handle 18 of the tool should the plug suddenly break free, as best seen in FIG. 2, and there by damage the wall or injure one's fingers.

It should also be emphasized that although this tool is designed to be used with electrical box there are other devices of a similar structure with which this tool will work quite well not to mention just a few, cable TV boxes, telephone boxes, and certain electrical type chassis, and certain elevator hardware.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A tool for quick removal of knock-out blocks in an electrical box within a wall which comprises:
   (a) an elongated insulated handle; and
   (b) a triangular shaped prying blade hook for prying out the knock out plugs from the electrical box said hook affixed to said handle, and wherein said hook comprises:
   (1) a flat shank portion that is secured to said handle;
   (2) a piercing blade portion having a beveled forward end forming a top point, said piercing blade portion extending outwardly from said flat shank portion to pierce the wall adjacent the electrical box;
   (3) an arm portion extending outwardly at an angle from the top of said piercing blade portion, the junction between said arm portion and said piercing blade portion forming a pivot point therebetween to engage a front edge of the electrical box; and
   (4) an engaging blade portion having curved outer and inner edges thus forming a tip end, said engaging blade portion extending outwardly and downwardly at an angle from the arm portion and forming a triangular configuration, the tip end being spaced from the top point and lying in a longitudinal plane below the longitudinal plane of the upper edge of said piercing blade which top edge includes said top point, whereby the tip end of said engaging plane will knock out a plug in the electrical box when said handle is pivoted against the electrical box.

2. A tool as recited in claim 1 wherein means are provided for preventing said handle from hitting the wall within which said electrical box is mounted when said tool is sized properly with said electrical box, and said tool is being used to knock out a plug in said electrical box.

3. A tool as recited in claim 1 that further comprises a ferrule attached around end of said handle where said flat shank portion engages said handle to give added strength to said tool.

4. A tool as recited in claim 2, in which said triangular shaped prying blade hook is made out of a single piece of steel.

5. A tool as recited in claim 3, in which said handle is made of an electrically insulating material.

* * * * *